United States Patent [19]

Young et al.

[11] 4,391,364

[45] Jul. 5, 1983

[54] AUTOMATIC LATCH FOR UNLOADING AUGER

[75] Inventors: Terry A. Young, Lititz; Aquila D. Mast, Lancaster, both of Pa.

[73] Assignee: Sperry Corporation, New Holland, Pa.

[21] Appl. No.: 235,396

[22] Filed: Feb. 18, 1981

[51] Int. Cl.³ .............................................. B65G 21/10
[52] U.S. Cl. .................................... 198/865; 198/320; 198/548; 414/504; 414/526; 366/186
[58] Field of Search ..................... 241/101 B; 198/313, 198/320, 632, 666, 668, 865, 545, 548, 555, 558, 536; 414/319, 320, 504, 505, 526, 326, 332; 366/50, 186, 603

[56] References Cited

U.S. PATENT DOCUMENTS 3,347,350 10/1967 Lindstrom et al. ................. 414/504
4,000,805 1/1977 Hadler ................................ 198/320

Primary Examiner—Joseph E. Valenza
Attorney, Agent, or Firm—Darrell F. Marquette; Frank A. Seemar; Larry W. Miller

[57] ABSTRACT

A movable unloading auger is automatically latched and unlatched with respect to a support member by connecting a lifting winch and cable to a movable latch arm attached to the auger, thus advantageously permitting hands-off latching and unlatching operations. A guide member includes a slot and the latch arm extends through the slot and terminates adjacent a latch arm receiver.

11 Claims, 4 Drawing Figures

AUTOMATIC LATCH FOR UNLOADING AUGER

BACKGROUND OF THE INVENTION

This invention relates generally to solid material comminution apparatus of the mill or mixer type and more particularly to an automatic latch for the unloading auger of an agricultural-mixer.

Grinder-mixers are well known agricultural devices for grinding and mixing various grains and grasses into a suitable feed mix for feeding livestock. Once the feed is ground and mixed it is conveyed, via an unloading auger, to a feeding or a storage location.

The unloading auger is attached to the grinder-mixer for movement which permits up and down pivoting as well as side-to-side swinging. When the auger is not in use, and partiuclarly when the grinder-mixer is being transported, it is important to secure the auger to limit movement thereof which could result in substantial hazard and damage.

Typically, an auger support provides a rest position for the auger and a latch secures the auger on the support. When the auger is to be used, the latch is manually released so that the auger can be raised or lowered and swung in an arcuate path relative to the grinder-mixer. A winch, in combination with a cable and one or more pulleys, is used to raise or lower the auger. When the auger is not in use, the auger is returned to the auger support and a latch is manually engaged to secure the auger on the support.

Manual release and engagement of the latch is undesirable for several reasons. It is time consuming, the latch is usually positioned for limited access so that the operator must climb and reach, and the operator is often required to release and engage the latch while simultaneously operating the winch. The latter is difficult because the winch and latch are usually at remote locations on the auger.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing an automatic latch for a movable auger used for unloading material generally from a container and more particularly for unloading crop material from agricultural machinery such as a grinder-mixer. A support member is provided for supporting the auger. A movable latch arm is mounted on the auger and engages a latch arm receiver. A winch and cable are operably connected to move the latch arm between a first position, in engagement with the receiver, and a second position, out of engagement with the receiver. A resilient member urges the latch arm to the first position. A guide plate includes a slot for receiving the latch arm. In this manner, movement of the latch arm is both guided and limited.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
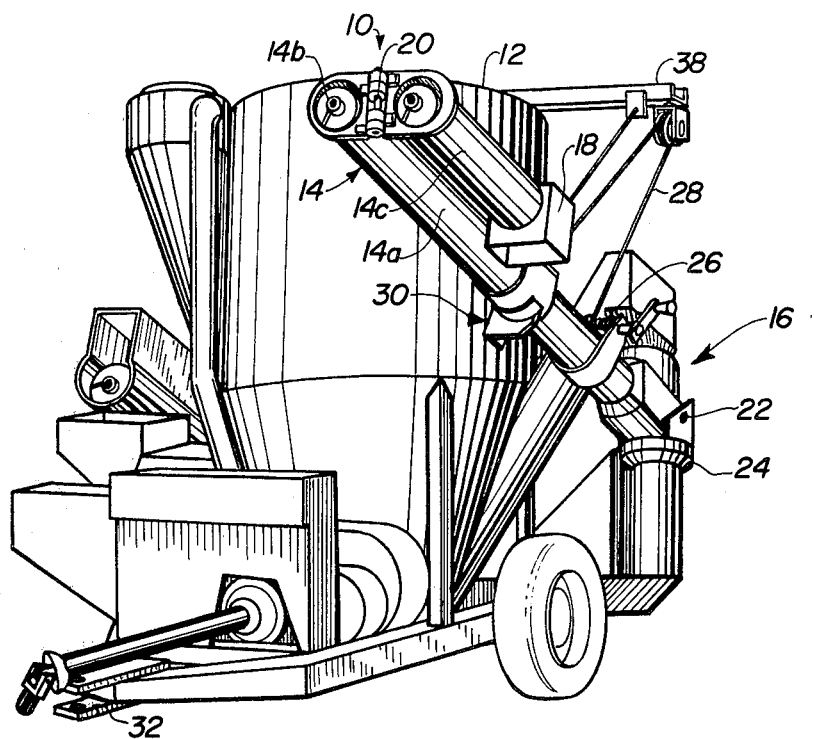
FIG. 1 is an isometric view illustrating an exemplary grinder-mixer utilizing an embodiment of the latching apparatus of this invention.

Referring to the drawings, FIG. 1 illustrates a commercially available agricultural grinder-mixer generally designated 10 and including a large container portion 12 wherein crop material is mixed. The resulting mix can be unloaded via a discharge device commonly called an unloading auger 14. As it is well known, auger 14 is an elongated tubular device 14a having an auger-like member 14b rotatably mounted therein for moving material from an infeed end 16 and outwardly through a spout 18. Often, as shown in FIG. 1, such unloading augers 14 include an extension 14c pivotally connected at 20 thus permitting a reduction in the overall length of the unloading auger when it is not in use.

Figure 2:
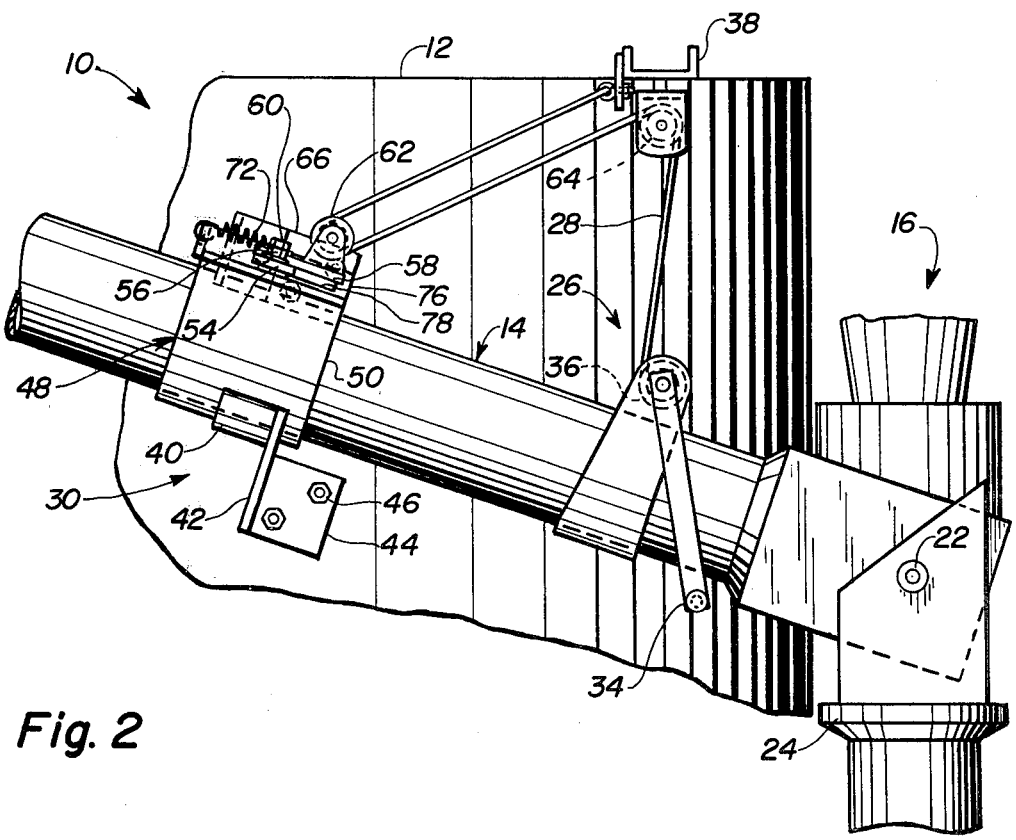
FIG. 2 is a diagrammatic view illustrating an embodiment of this invention.

It is well known that infeed end 16 is pivotally and rotatably connected at 22,24, respectively to grinder-mixer 10. This permits spout 18 to be directed to a desired position for discharge of the crop material. Also, well known is the fact that a winch 26 and cable 28 combination are operably connected for raising and lowering unloading auger 14 relative to a support member 30 connected to grinder-mixer 10 for supporting auger 14 in a "stored" position when not in use, such as when grinder-mixer 10 is to be transported, usually by a tow connected at tow bar 32. As illustrated in FIGS. 1 and 2, winch 26 is attached to auger 14 and includes a rotatable handle 34 for winding cable 28 on a drum 36. Cable 28 is connected to the auger 14 and the grinder-mixer 10 (at a support 38), and through varying a number of pulleys and cable strands, mechanical advantage can be controlled.

Figure 3:
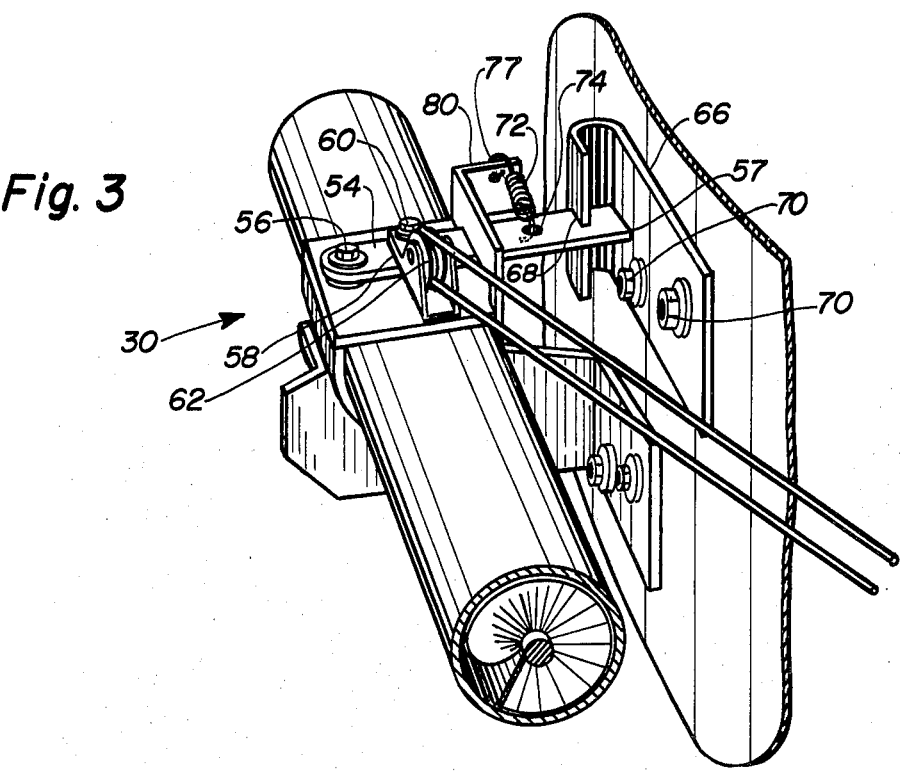
FIG. 3 is an isometric view illustrating an embodiment of this invention mounted on an auger.

Support member 30, FIGS. 2 and 3, generally includes a fabricated steel cradle portion 40 having a generally arcuate shape of a construction sufficient for receiving auger 14. A steel brace 42 is connected by welding or the like to cradle 40, and extends to include a flange 44 which is attached to container 12 by bolts 46 or the like.

Figure 4:
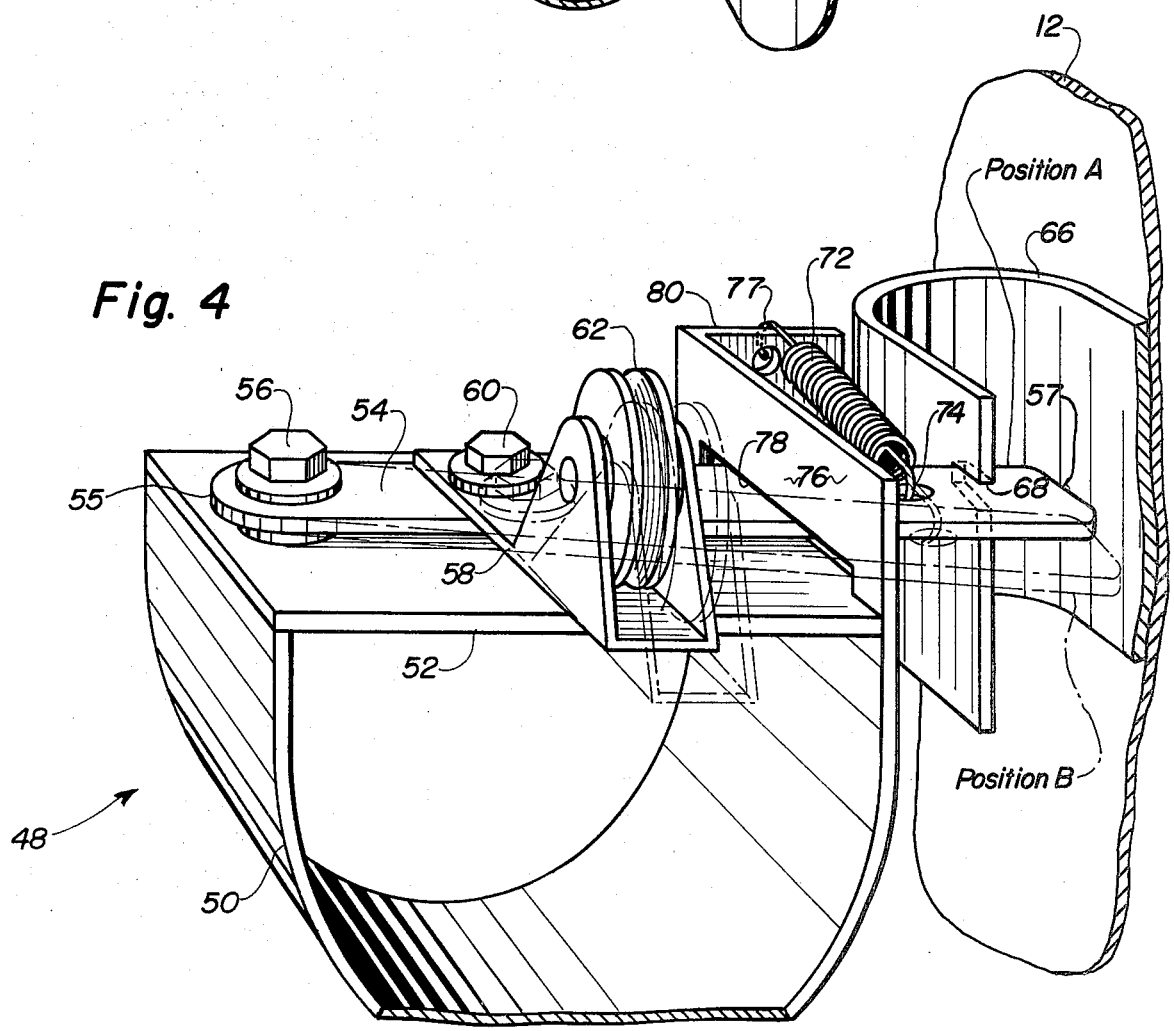
FIG. 4 is an isometric view illustrating an embodiment of the latching apparatus of this invention.

A fabricated steel D-shaped reinforcing collar 48, FIG. 4, is attached by welding to auger 14. Collar 48 is aligned for seating in cradle 40 and includes an arcuate portion 50 welded to a flat portion 52. A steel latch arm member 54 is pivotally connected at a first end 55 to flat portion 52 by a bolt 56, and a bent steel extension 58 is attached by bolt 60 to protrude from latch arm 54.

Referring also to FIG. 2, a pulley 62 is appropriately connected to extension 58. Cable 28 extends from drum 36, via another pulley 64 connected to support 38, around pulley 62 and terminates at support 38. As stated previously, the number of pulleys and cable strands can be varied to control the mechanical advantage desired.

A generally U-shaped steel latch arm receiver 66, FIG. 4, includes a slot 68 formed therein. Slot 68 is of a construction sufficient for receiving a second end 57 of latch arm member 54 when auger 14 is seated in cradle 40. Receiver 66 is attached to container 12 by bolts 70 or the like.

Winch 26 and cable 28 provide a means for raising and lowering auger 14 relative to support 30. Thus, a tensioning force applied to cable 28 will tend to pivot latch arm 54 from a first or solid line position A, in slot 68, to a second or dotted line position B, wherein latch arm 54 is pivoted out of slot 68. When such tensile force is removed and cable 28 becomes relaxed, such as when auger 14 is resting in support 30, a resilient means, such as a steel tension spring 72, urges latch arm 54 from the second position to the first position. Spring 72 is connected at one end 74 to latch arm 54 and at another end 77 to a guide means 76.

Guide means 76 is provided for functioning as a guide and a limit for limiting movement of latch arm 54. This is accomplished by means of a slot 78 formed in guide 76 for receiving latch arm 54. Guide 76 is preferably a steel flat attached to collar 48, such as by welding, and includes a flange portion 80 for receiving end 77 of spring 72.

With the parts assembled as set forth above it can be seen that movement of handle 34, such as to apply a tensile force to cable 28, will raise auger 14 out of support 30. Due to the connection of cable 28 to latch arm 54 at pulley 62, latch arm 54 is pivoted a distance limited by slot 78 but sufficient for moving end 57 of latch arm 54 clear of slot 68 in receiver 66. Thus, auger 14 is automatically unlatched.

When auger 14 is lowered to rest in support 30, calbe 28 becomes relaxed and sprng 72 urges end 57 of latch arm 54 into slot 68. Thus auger 14 is automatically latched.

The foregoing has described an automatic latching apparatus for use with an auger used for unloading material from a container.

It is anticipated that aspects of the present invention, other than those specifically defined in the appended claims, can be obtained from the foregoing description and the drawings.

Having thus described the invention, what is claimed is:

1. In combination with a container having a movable unloading auger, the improvement comprising:
   means for supporting said auger, said means being a support member connected to said container and extending therefrom;
   a latch arm movably mounted on said auger;
   a latch arm receiver connected to said container;
   means connected for raising and lowering said auger relative to said support, said means including a cable operably connected to move said latch arm between a first position, in engagement with said receiver, and a second position, out of engagement with said receiver;
   resilient means for urging said latch arm from said second position to said first position;
   means for guiding said latch arm and for limiting movement of said latch arm in said second position, said means being a guide plate having a latch arm receiving slot formed therein, said latch arm extending through said slot and terminating adjacent said receiver;
   said latch arm being moved from said first position to said second position when the tension in said cable overcomes the force of said resilient means; and
   said latch arm being moved from said second position to said first position when the force of said resilient means overcomes the tension in said cable.

2. The apparatus of claim 1 wherein said guide plate is connected to said auger.

3. The apparatus of claim 1 wherein said resilient means is connected between said guide plate and said latch arm.

4. The apparatus of claim 1 wherein said guide plate is connected to said auger and said resilient means has a first end connected to said guide plate and a second end connected to said latch arm.

5. The apparatus of claim 1 wherein said supporting means includes a cradle portion and said auger includes a collar member aligned on said auger with said cradle, said latch arm being pivotally attached to said collar.

6. The apparatus of claim 5 wherein said latch arm receiver includes a slot formed therein, said latch arm and said slot being aligned in response to said upper being seated in said cradle.

7. The apparatus of claim 5 wherein said latch arm member includes a bent extension member and a pulley is connected to said bent extension member.

8. The apparatus of claim 7 wherein said cable engages said pulley connected to said bent extension member.

9. The apparatus of claim 5 wherein said collar includes an arcuate portion connected to a flat portion, said latch arm member being pivotally connected to said flat portion.

10. The apparatus of claim 9 wherein said guide plate is attached to said collar and said slot guide plate is positioned adjacent said flat portion for receiving said latch arm member.

11. An agricultural grinder-mixer comprising:
    an unloading auger movably connected to the mixer;
    support member connected to and extending from said mixer;
    a latch arm movably connected to said auger;
    means connected for raising and lowering said auger relative to said support, said means including a winch and cable operably connected to move said latch arm;
    a latch arm receiver connected to said mixer;
    means for guiding and limiting movement of said latch arm into and out of engagement with said receiver, said latch arm extended through a movement limiting slot in said guide means and further extended into a slot in said receiver;
    resilient means connected for urging said latch arm into a first position engaged with said receiver;
    means connected for moving said latch arm to a second position disengaged from said receiver in response to movement of said winch and cable, said means including an extension member and a pulley connected to said latch arm and to said cable;
    said latch arm being moved from said first position to said second position when the tension in said cable overcomes the force of said resilient means; and
    said latch arm being moved from said second position to said first position when the force of said resilient means overcomes the tension in said cable.

* * * * *